Patented June 2, 1953

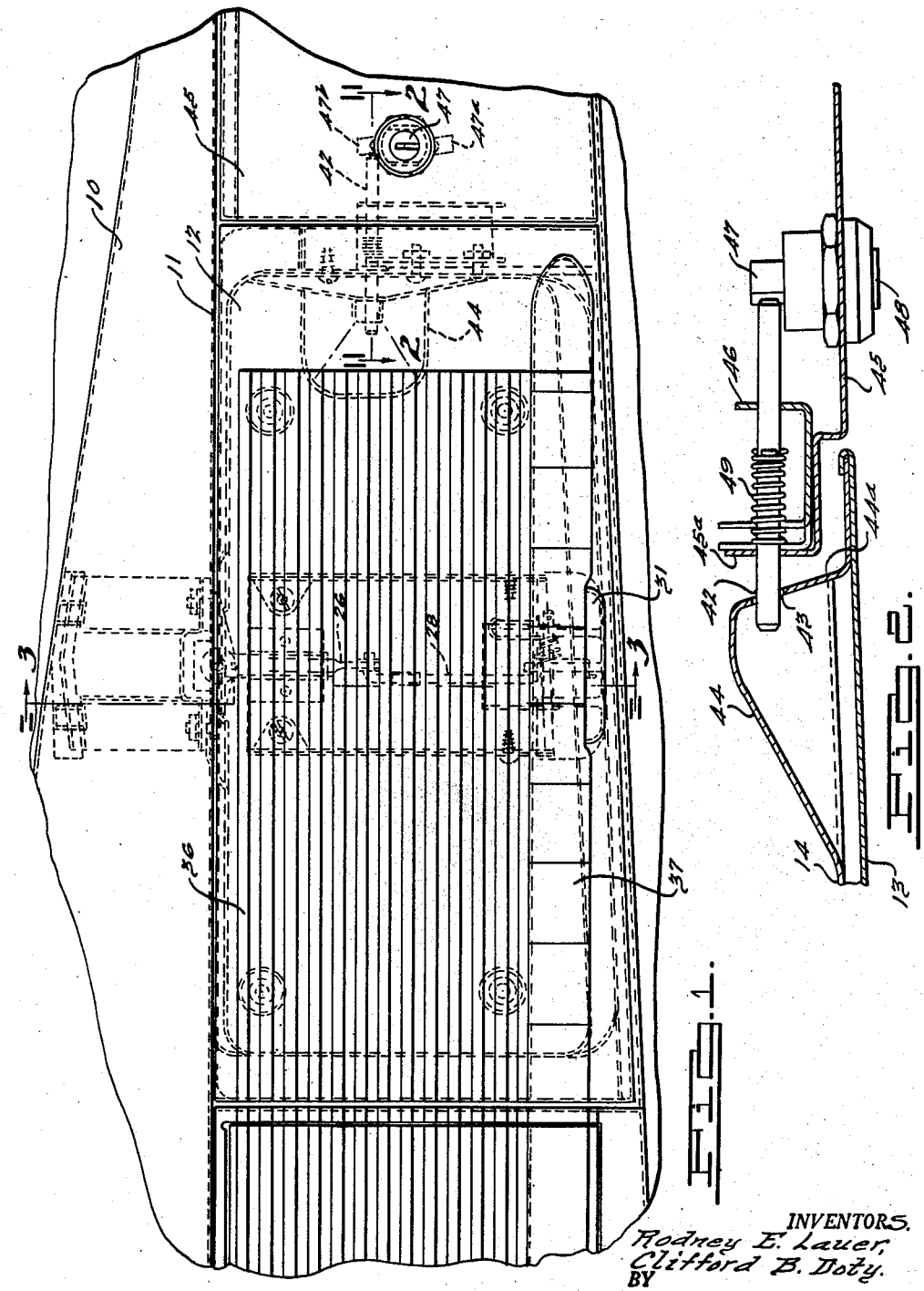

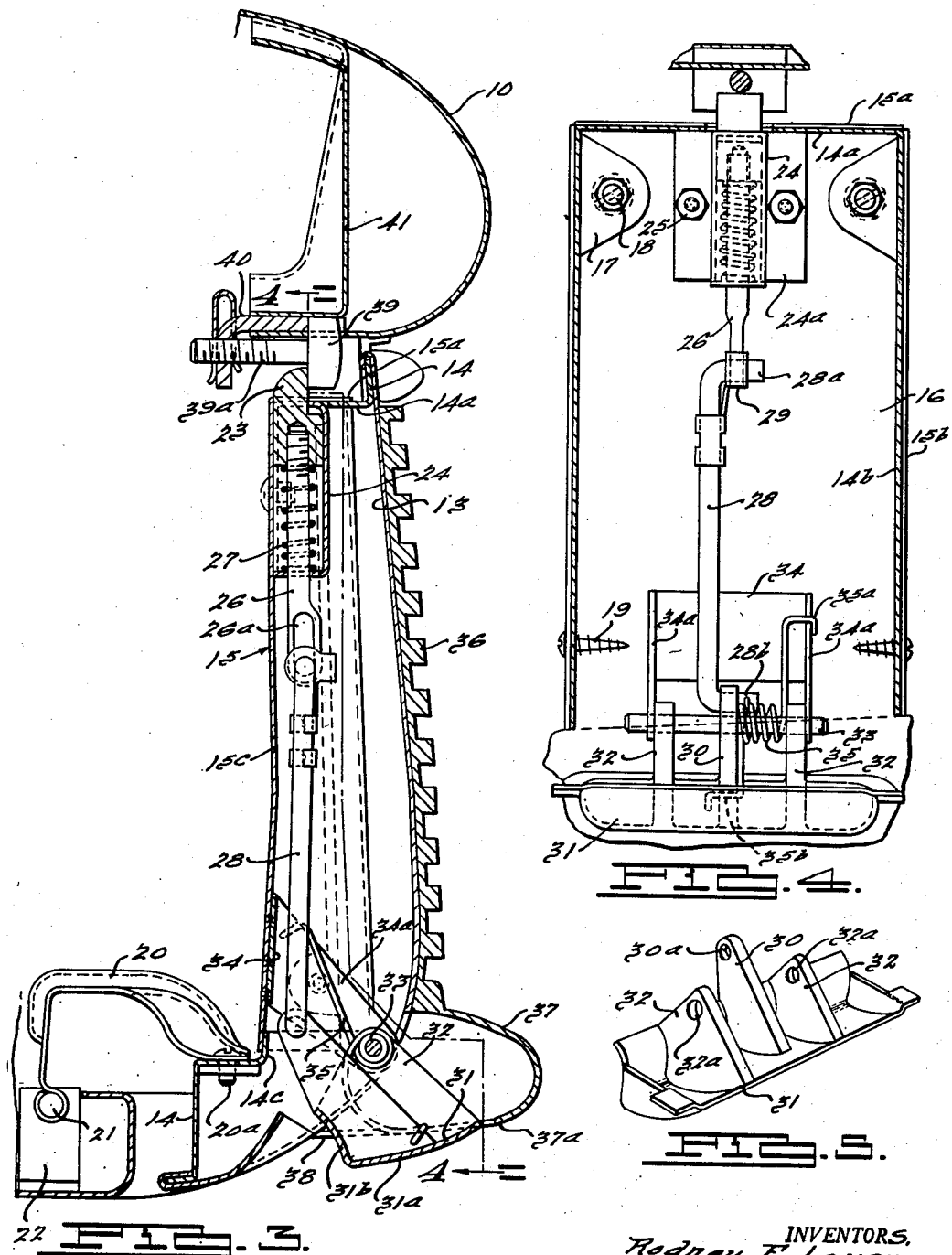

2,640,723

UNITED STATES PATENT OFFICE 2,640,723

GLOVE COMPARTMENT DOOR LATCH

Rodney E. Lauer, Grosse Pointe, and Clifford B. Doty, Detroit, Mich., assignors to Briggs Manufacturing Company, a corporation of Michigan Application September 4, 1947, Serial No. 772,084

9 Claims. (Cl. 296—37)

This invention relates to a latch mechanism for swinging doors or closures and in particular to a latch mechanism useful in connection with so-called glove box or glove compartment doors of vehicle bodies, especially the hinged doors or closures of the glove boxes or compartments of automobile bodies.

In the fabrication of automobile bodies, it is customary to provide at the locality of the instrument panel and in front of the driver's seat a compartment, usually termed a glove box, which is closed by means of a door or closure member hinged at its lower edge and provided with a latch device at its upper edge having adjacently located manually operable releasing means exposed on the instrument panel or the glove box door. Conventional releasing means for the latch is usually inconveniently located for operation by the front seat occupant, especially the driver, and in addition frequently detracts from the appearance of the instrument panel.

An object of the invention is to provide an improved latch device for a glove box door or the like of a vehicle body, such as an automobile body, which is provided with manually operable releasing means which is not only convenient and easy to operate but also substantially concealed from view.

A further object of the invention is to provide a latch device of improved construction for a glove box door or the like and wherein means is provided at or adjacent the lower hinged edge of the door, preferably inconspicuously located or substantially concealed from view, for enabling manual release of the latch.

Another object of the invention is to provide a glove box door hinged at its lower edge and adapted to be latched at its upper edge, the latch device being releasable by means of a pivoted finger piece at or near the lower edge of the door which may be conveniently engaged by the fingers and which is preferably concealed or rendered inconspicuous by means of an overlying protruding portion on the front panel of the door.

Still another object of the invention is to provide a glove box door of improved construction which is hinged at its lower edge to swing downwardly when unlatched, the door being provided with a spring latch which may be released by means of a finger piece or element arranged preferably beneath the front of the door, and wherein improved means is provided independently of the spring latch for locking the door by means of a key operated device.

Other objects of this invention will appear in the following description and appended claims, reference being had to the accompanying drawings forming a part of this specification wherein like reference characters designate corresponding parts in the several views.

Fig. 1 is a fragmentary front elevation of an instrument panel embodying a glove compartment adapted to be closed by means of a hinged door equipped with locking mechanism constructed in accordance with one embodiment of the present invention.

Fig. 2 is an enlarged fragmentary sectional view taken substantially through lines 2—2 of Fig. 1 looking in the direction of the arrows.

Fig. 3 is an enlarged fragmentary vertical section taken substantially through lines 3—3 of Fig. 1 looking in the direction of the arrows.

Fig. 4 is a section taken substantially through lines 4—4 of Fig. 3 looking in the direction of the arrows.

Fig. 5 is a perspective view of the pivoted latch release member or finger piece.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, a hinged glove box or compartment door equipped with latch mechanism constructed in accordance with one embodiment of the present invention. In the present instance the glove compartment, or the like, is provided beneath the windshield at the front of an automobile body in advance of the front seat, a portion of the instrument panel being illustrated at 10. The instrument panel has a transverse opening 11 through which the glove compartment is accessible, and this compartment is adapted to be closed by means of a door 12 fitting within a portion of the opening 11 in the instrument panel. The glove compartment door 12 comprises a front pressed metal panel 13 and a rear pressed metal panel 14. These panels are secured together around their edges to provide projecting overlap flanges, as clearly illustrated in Figs. 2 and 3.

Mounted upon the rear panel 14 of the glove compartment door is a box-like lock casing 15. The panel 14 is cut away to provide a central aperture 16 in an embossed portion of the panel. The lock casing 15 is formed with a top flange 15a which overlaps a flanged portion 14a of the rear panel, and the casing is also formed with side flanges 15b which overlap side flanges 14b on the panel 14 which extend along the margins of the aperture 16. Thus, the lock casing is formed to fit over the top and side flanges 14a and 14b, extending around the aperture 16 in the rear door panel 14, thus closing this aperture. The back wall 15c of the lock casing overlaps a flanged edge 14c of the back panel, as illustrated in Fig. 3. Struck inwardly from the flanges 14b of the panel 14 are a pair of ears 17 to which the upper portion of the back wall 15c of the lock casing is secured by means of bolts and nuts 18. The side flanges 15b of the lock casing are secured to the flanges 14b near the lower ends thereof by means of transversely extended screws 19.

For the purpose of hinging the glove compartment door 12 at or adjacent its lower edge so as to permit the door to swing rearwardly and downwardly to permit access to the glove compartment, a pair of transversely spaced hinge arms 20 are secured by means of screws 20a to the rear panel 14 of the door near the lower end thereof. These hinge arms 20 are suitably shaped, such as illustrated in Fig. 3, and the forward ends thereof are hinged by means of hinge pins 21 to hinge brackets 22 secured to the bottom of the instrument panel and forwardly of the lower edge of the glove compartment door. Thus, the door when unlatched, may swing rearwardly and downwardly about the axis of the hinge pins 21.

The latch mechanism for the compartment door 12 comprises a suitable latch bolt 23 which extends freely through aligned apertures in the overlapping flanges 15a and 14a in the upper edge of the door. The bolt 23 is slidable within a generally rectangularly guide casing 24 having lateral flanges 24a fastened by means of bolts and nuts 25 to the back wall of the lock casing 15. Threaded into the lower portion of the bolt 23 is a stem or rod 26 which passes downwardly through an aperture in the bottom of the casing 24. Interposed between the bottom of the bolt 23 and the bottom of the casing 24 and surrounding the stem 26 is a compression spring 27 which functions to urge the bolt upwardly to its latching position shown in Figs. 3 and 4. The lower end of the stem 26 is flattened and formed with a vertical slot 26a into which extends the bent upper end 28a of a vertically extended rod 28. An anti-rattle spring coupling 29 connects the rod 28 with the stem 26 and the lower end of the rod 28 is formed with a bent portion 28b extending into a hole 30a in the upper end of an ear 30 integral with a finger piece or latch release member 31. The ear 30 is located centrally of the finger piece 31 and the latter is formed integrally with similar upwardly projecting hinge members or ears 32 disposed at opposite sides of the ear 30. As shown in Fig. 3, the upper ends of the hinge ears 32 are offset rearwardly of the ear 30 to provide clearance for a hinge pin or pintle 33 which extends through apertures 32a in the ears 32. This hinge pin also extends through aligned apertures in projecting side flanges 34a of a bracket 34 spot welded to the back wall 15c of the lock casing 15. Thus, it will be seen that the finger piece or release member 31 is pivotally mounted upon the fixed bracket 34 through the medium of the hinge pin 33.

Up and down pivotal movement of the finger piece or release member 31 is resisted by means of a suitable spring 35 which in the present instance is fabricated from a length of spring wire bent intermediate its ends to provide a number of coils embracing the pivot pin 33. The upper hook end 35a of this spring is anchored in a notch in one of the flanges 34a of the bracket 34. the lower hook end 35b of the spring is hooked over the lower edge of the ear 30.

In the present embodiment of the invention the front panel 13 of the glove compartment door carries an ornamental transversely ribbed panel 36 which is secured to the panel 13 in any suitable manner, such as by spot welding. The ornamental panel 36 terminates along its lower edge in a protruding curved or convexed embossment 37 which, as shown in Fig. 3, overlies the pivoted finger piece 31 and largely conceals the same. The bottom wall 37a of the embossment 37 has an aperture or opening 38 to receive the finger piece 31. It will be noted that the bottom wall 31a of the finger piece protrudes angularly a small distance below the bottom wall 37a so as to position the finger indentation 31b at the back of the finger piece for convenient engagement by the fingers when it is desired to actuate the finger piece and disengage or retract the latch bolt 23. In order to actuate the finger piece 31 it is thus merely necessary to place the thumb against the upper surface of the embossment 37, engage the indentation 31b with the fingers, and exert upward pressure thereon so as to impart upward pivotal motion to the finger piece. This operation results in swinging the ear 30 downwardly thus retracting the latch bolt through the medium of the connecting members 26 and 28. Upon release of the finger piece the spring 27 forces the latch bolt upwardly into latching position.

The latch bolt 23 cooperates with a keeper device carried by the instrument panel immediately above the upper edge of the door centrally thereof. In the present instance this keeper device is in the form of a threaded stud having a head 39 engaged by the bolt. The shank 39a of the stud is threaded into a tapped hole in the depending flange of an angle bracket 40 secured to the instrument panel and to a transverse stringer or cross brace 41 for the panel. The stud 39 has a slot or kerf on its face engageable by a screw driver to permit adjustment of the stud relative to the latch bolt.

As illustrated in Figs. 1 and 2 separate locking means for the glove compartment door is provided. This locking means is independent of the door latch mechanism and comprises a transversely and horizontally shiftable locking pin or bolt 42. In its locked position the locking pin 42 projects through a hole 43 in the adjacent side wall 44a of an embossment 44 formed on the inner door panel 14 adjacent one side edge thereof. The corresponding side edge of the opening into the glove compartment is formed by the edge flange 45a of a panel 45 fixed within the transverse opening 11 of the instrument panel 10. The locking pin 42 is carried by a channel bracket 46 rigidly secured to the panel 45, the bracket as well as the flange 45a having openings for slidably receiving the locking pin. In order to project the locking pin through the hole 43 so as to lock the glove compartment door there is provided an eccentric stud or arm 47 having a flat face engageable with the outer end of the pin 42. This stud 47 is carried by the rotatable shaft of a conventional cylinder lock 48 which is rotatable in the usual manner by means of a key. The actuating stud or arm 47 for the locking pin 42 is rotatable through an arc of one hundred eighty degrees from the dotted line position shown at 47a in Fig. 1 to the dotted line position shown as 47b in this figure. The locking pin 42 is retracted through the medium of a coil spring 49 anchored at one end to the locking pin and engageable at its opposite end with one flange of the bracket 46. In the position of the actuating stud or arm 47 shown at 47a in Fig. 1 the locking pin 42 will be retracted by means of the spring 49. Upon turning the key in the cylinder lock 48 the stud or arm 47 will be rotated to the position shown at 47b thereby forcing the locking pin into the hole 43 in the manner shown in Fig. 2.

We claim:

1. In a vehicle body having a glove compartment, a door for said compartment hinged adjacent its lower edge, said door including a rear upright panel extending downwardly with the lower portion thereof extending forwardly and formed with an aperture, a finger operable member extending through said aperture and pivoted intermediate the front and rear thereof to the door to cause the rear portion of said member to swing upwardly and the front portion to swing downwardly when the rear portion is engaged by the fingers and pressed upwardly, said panel having a rearwardly projecting hollow portion having a top wall overlying the rear portion of said member and a bottom wall spaced below said top wall and apertured to receive said rear portion, and means at the front portion of said member connectible with a movable latch operating device for actuation thereof.

2. In a vehicle body having a glove compartment door hinged adjacent its lower edge, the combination of a rear upright panel for said door extending downwardly with the lower portion thereof extending forwardly and formed with an aperture, a finger operable member extending through said aperture and pivoted intermediate the front and rear thereof to the door to cause the rear portion of said member to swing upwardly and the front portion to swing downwardly when the rear portion is engaged by the fingers and pressed upwardly, said panel having a rearwardly projecting housing portion within which said rear portion of the member is movable, and means for connecting the front portion of said member to a movable latch device adapted to be mounted adjacent the upper edge of the door.

3. A vehicle body structure comprising supporting means having a glove compartment and also comprising a door for said compartment hinged adjacent the door's lower edge to said supporting means, said door including a rear upright panel having its lower portion extended forwardly to underlie the upper edge of the door, said lower portion having an aperture, a finger operable member extending into said aperture and pivoted on said structure, said panel adjacent its lower edge having a rearwardly projecting hollow portion within which a rear portion of said member is movable and provided with a top wall overlying said rear portion and a bottom wall spaced below said top wall and apertured to receive said rear portion, and means for connecting the front portion of said member to a movable latch device adapted to be mounted adjacent the upper edge of the door.

4. A vehicle body structure comprising supporting means having a glove compartment and also comprising a door for said compartment hinged adjacent the door's lower edge to said supporting means, said door including a rear upright panel having its lower portion extended forwardly to underlie the upper edge of the door, said lower portion having an aperture, a finger operable member extending into said aperture and pivoted on said structure intermediate the front and rear portions of the member and above the rear portion thereof to swing the rear portion upwardly and the front portion downwardly when the rear portion is engaged by the fingers and pressed rearwardly and upwardly, said panel adjacent its lower edge having a rearwardly projecting hollow portion within which said rear portion is movable and provided with a top wall overlying said rear portion and a bottom wall spaced below said top wall and apertured to receive said rear portion, and means at the front portion of said member engageable with a latch operating device.

5. In a vehicle body having a glove compartment, a swinging door for said compartment hingedly mounted adjacent its lower edge on a portion of the body, said door including a rear panel provided at or adjacent its lower edge with a rearwardly projecting hollow embossment, a finger piece pivoted to the door and extending within said embossment and shiftable in an aperture in the lower wall of the embossment, and means connecting said finger piece to a latch adapted to be mounted at the upper edge of the door.

6. In a latch operating mechanism for a glove compartment door hinged adjacent its lower edge and having a rear upright panel extending downward and formed at its lower portion with a forward extension having an aperture therein, said latch operating mechanism comprising a finger operable member extending into said aperture and pivoted to the door intermediate the front and rear of the member to cause the rear portion thereof to swing upwardly and the front portion to swing downwardly when the rear portion is engaged by the fingers and pressed upwardly, and means for connecting the front portion of said member to a movable latch device adapted to be mounted adjacent the upper edge of the door.

7. In a latch operating mechanism for a vehicle body structure comprising a support and a glove compartment door hinged adjacent its lower edge to said support and having a rear upright panel extending downward and formed at its lower portion with a forward extension having an aperture therein, said latch operating mechanism comprising a finger operable member extending into said aperture and pivoted on said structure intermediate the front and rear of the member to cause the rear portion thereof to swing upwardly and the front portion thereof to swing downwardly when the rear portion is engaged by the fingers and pressed upwardly, and means for connecting the front portion of said member to a movable latch device adapted to be mounted adjacent the upper edge of the door.

8. In a vehicle body construction having a glove compartment, a door for said compartment and hinged adjacent its lower edge to the body, said door comprising a rear upright panel formed at its lower portion with a forwardly and downwardly opening hollow rearward embossment and also with a forward extension having an aperture therein, a manually operable device pivoted intermediate its front and rear ends on the lower part of the door to rock about a generally horizontal axis substantially parallel to and rearward of the hinge axis of the door, said device extending generally forward into said aperture and being adapted at its forward end for connection with latch bolt operating means, said device extending generally rearward into said hollow embossment and being shiftable therein by finger pressure applied from below the latter.

9. In a vehicle body construction having a glove compartment, a door for said compartment and hinged adjacent its lower edge to the body, a manually operable device pivoted intermediate its front and rear ends to the door, means at the forward end of said device for connection with latch operating means, and a rearward projection extending from the lower portion of the door and overlying the rearward portion of said device, said projection having a downward portion rearward of said device, the latter being shiftable below said projection by finger pressure applied from below.

RODNEY E. LAUER.
CLIFFORD B. DOTY.

References Cited in the file of this patent

UNITED STATES PATENTS

| Number | Name | Date |
|---|---|---|
| 88,488 | Jordan | Mar. 30, 1869 |
| 638,439 | Bowen | Dec. 5, 1899 |
| 1,215,843 | Painter et al. | Feb. 13, 1917 |
| 1,249,472 | Painter et al. | Dec. 11, 1917 |
| 1,357,112 | Patton | Oct. 26, 1920 |
| 2,082,921 | Vetorino | June 8, 1937 |
| 2,151,113 | Jacobi | Mar. 21, 1939 |
| 2,172,586 | Jacobi | Sept. 12, 1939 |
| 2,218,038 | Gaffney | Oct. 15, 1940 |

FOREIGN PATENTS

| Number | Country | Date |
|---|---|---|
| 393,448 | France | Oct. 27, 1908 |